(12) United States Patent
Kim et al.

(10) Patent No.: US 11,228,797 B2
(45) Date of Patent: Jan. 18, 2022

(54) ELECTRONIC APPARATUS AND METHOD OF CONTROLLING THE SAME

(71) Applicant: SAMSUNG ELECTRONICS CO., LTD., Suwon-si (KR)

(72) Inventors: Kwanyoung Kim, Suwon-si (KR); Dongwook Kim, Suwon-si (KR); Seungil Yoon, Suwon-si (KR); Hyunkyu Yun, Suwon-si (KR); Jaemyung Hur, Suwon-si (KR); Jungseop Kim, Suwon-si (KR); Hojune Yoo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/589,561

(22) Filed: Oct. 1, 2019

(65) Prior Publication Data
US 2020/0107065 A1  Apr. 2, 2020

(30) Foreign Application Priority Data

Oct. 1, 2018 (KR) .................. 10-2018-0116937

(51) Int. Cl.
*H04N 21/422* (2011.01)

(52) U.S. Cl.
CPC . *H04N 21/42221* (2013.01); *H04N 21/42212* (2013.01); *H04N 21/42225* (2013.01)

(58) Field of Classification Search
None
See application file for complete search history.

(56) References Cited

U.S. PATENT DOCUMENTS 6,040,829 A * 3/2000 Croy .................. H04N 21/4126
715/864
6,618,827 B1 * 9/2003 Benavides ..... G01R 31/318536
714/726
(Continued)

FOREIGN PATENT DOCUMENTS

JP  2007243381 A  9/2007
JP  4462211 B2  5/2010
(Continued)

OTHER PUBLICATIONS

Communication dated Dec. 16, 2019 issued by the European Patent Office in counterpart European Application No. 19200281.4.
(Continued)

*Primary Examiner* — An Son P Huynh
(74) *Attorney, Agent, or Firm* — Sughrue Mion, PLLC

(57) ABSTRACT

An electronic apparatus is provided. The electronic apparatus includes a signal receiver configured to receive a first wireless signal; a signal transmitter configured to output a second wireless signal; and a processor configured to: identify an external apparatus based on an input key indicated by the first wireless signal as the first wireless signal is repeatedly received through the signal receiver; identify the second wireless signal based on the input key and the external apparatus; and control the signal transmitter to repeatedly output the second wireless signal while the first wireless signal is repeatedly received. Each of the first wireless signal and the second wireless signal alternately comprises a signal section corresponding to the input key and an idle section, and the processor is further configured to control the signal transmitter to output the second wireless signal during the idle section of the first wireless signal.

16 Claims, 11 Drawing Sheets

(56) References Cited

U.S. PATENT DOCUMENTS

| | | | | |
|---|---|---|---|---|
| 7,814,524 B2* | 10/2010 | Candelore | ............... | H04N 21/47 725/113 |
| 8,108,886 B1* | 1/2012 | Murahashi | ....... | H04N 21/44222 725/13 |
| 8,654,074 B1* | 2/2014 | Auguste | ..................... | A61F 4/00 345/156 |
| 9,807,344 B2* | 10/2017 | Hines | ................... | H04N 13/271 |
| 2003/0227944 A1* | 12/2003 | Nierzwick | ............. | G08C 23/04 370/503 |
| 2004/0001474 A1* | 1/2004 | Simelius | ............... | H04W 76/22 370/349 |
| 2004/0189485 A1* | 9/2004 | Wang | ..................... | G08C 17/02 340/13.26 |
| 2006/0002335 A1* | 1/2006 | Itoh | ........................ | H04M 1/66 370/328 |
| 2007/0229299 A1 | 10/2007 | Suzuki | | |
| 2007/0288959 A1* | 12/2007 | Istvan | ................ | H04N 21/4316 725/39 |
| 2008/0174467 A1* | 7/2008 | Drimusz | ................ | G08C 19/28 341/176 |
| 2010/0153885 A1* | 6/2010 | Yates | ................. | H04N 21/4532 715/841 |
| 2010/0172248 A1 | 7/2010 | Shiraishi | | |
| 2010/0315563 A1* | 12/2010 | Park | ................. | H04N 21/41265 348/734 |
| 2012/0200397 A1 | 8/2012 | Nakajima et al. | | |
| 2012/0256735 A1* | 10/2012 | Gilson | ................... | G08C 19/16 340/12.17 |
| 2012/0326850 A1* | 12/2012 | Kim | ................. | H04N 21/42204 340/12.22 |
| 2013/0027613 A1* | 1/2013 | Kim | ................. | H04N 21/43637 348/563 |
| 2013/0076853 A1* | 3/2013 | Diao | ...................... | H04N 7/157 348/14.08 |
| 2013/0141650 A1* | 6/2013 | Jeong | ................. | H04N 21/4345 348/732 |
| 2014/0109125 A1* | 4/2014 | Kim | ................. | H04N 21/44204 725/14 |
| 2016/0127773 A1* | 5/2016 | Kang | ................. | H04N 21/4436 348/730 |
| 2016/0321102 A1* | 11/2016 | Lee | ...................... | G06F 9/5088 |
| 2016/0323546 A1* | 11/2016 | Hines | .................. | H04N 13/167 |
| 2016/0343246 A1 | 11/2016 | Haughawout et al. | | |
| 2017/0257668 A1* | 9/2017 | Kim, II | ............ | H04N 21/25833 |
| 2018/0131892 A1* | 5/2018 | Vergis | .............. | H04N 21/42204 |
| 2018/0139502 A1* | 5/2018 | Kim | ................. | H04N 21/44008 |
| 2018/0167680 A1* | 6/2018 | Fine | ................. | H04N 21/42221 |

FOREIGN PATENT DOCUMENTS

| | | |
|---|---|---|
| KR | 1020090121065 A | 11/2009 |
| KR | 101789225 B1 | 11/2017 |

OTHER PUBLICATIONS

International Search Report and Written Opinion (PCT/ISA/210 & 237) dated Jan. 30, 2020 from the International Searching Authority in counterpart application No. PCT/KR2019/012615.

* cited by examiner

FIG. 1
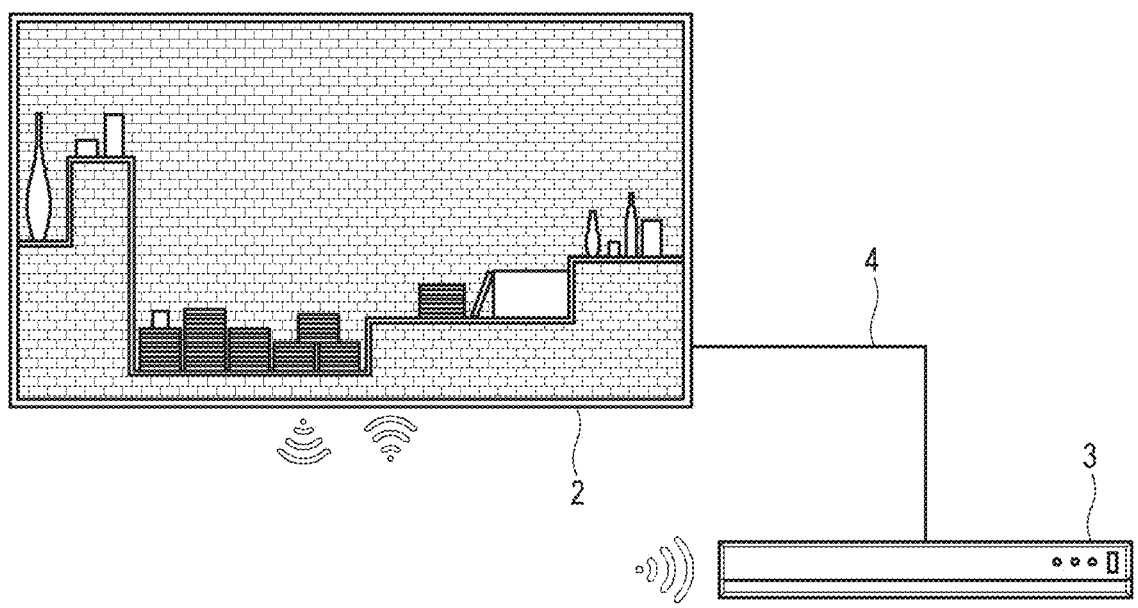
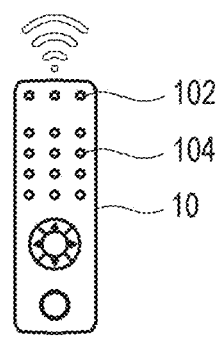

ELECTRONIC APPARATUS AND METHOD OF CONTROLLING THE SAME

CROSS-REFERENCE TO RELATED THE APPLICATION

This application is based on and claims priority under 35 U.S.C. § 119 to Korean Patent Application No. 10-2018-0116937, filed on Oct. 1, 2018, in the Korean Intellectual Property Office, the disclosure of which is incorporated by reference herein in its entirety.

BACKGROUND

Field

The disclosure relates to an electronic apparatus, a method of controlling the same, a display apparatus, and a universal remote controller.

Description of Related Art

A display apparatus, which displays an image based on an image signal received from the outside or generated, includes various parts that may be classified according to functions with respect to a display panel on which the image is displayed. Further, the display apparatus may be used together with various kinds of peripheral devices.

For example, the display apparatus may be used together with an external apparatus and an input device such as a remote controller. In this case, a universal remote controller supporting Bluetooth and infrared communication may use the infrared communication in pairing with the display apparatus and use only a Bluetooth signal or both the Bluetooth signal and an infrared signal in controlling the display apparatus. When the universal remote controller is paired with the display apparatus and controls the external apparatus, a Bluetooth signal is transmitted to the display apparatus, the display apparatus receives the Bluetooth signal and the display apparatus selects the external apparatus to be controlled according to the current display environments. For example, when the display environment of the display apparatus is concerned with a set-top box, a channel key input through the universal remote controller is converted into a set-top box channel key so that the infrared signal can be emitted to the set-top box directly or through the universal remote controller. In this case, the Bluetooth signal of the universal remote controller and the infrared signal emitted from the display apparatus do not interfere with each other, and operation is normally performed. However, such a conventional universal remote controller has to include both an infrared communication module and a Bluetooth communication module, and thus manufacturing costs increase.

SUMMARY

Provided is a solution to universally control both an electronic apparatus and an external apparatus through an inexpensive infrared interface for cost reduction.

According to embodiments of the disclosure of the disclosure, there is provided an electronic apparatus including: a signal receiver configured to receive a first wireless signal; a signal transmitter configured to output a second wireless signal; and a processor configured to: identify an external apparatus based on an input key indicated by the first wireless signal as the first wireless signal is repeatedly received through the signal receiver; identify the second wireless signal based on the input key and the external apparatus; and control the signal transmitter to repeatedly output the second wireless signal while the first wireless signal is repeatedly received. Each of the first wireless signal and the second wireless signal alternately includes a signal section corresponding to the input key and an idle section, and the processor is further configured to control the signal transmitter to output the second wireless signal during the idle section of the first wireless signal.

The first wireless signal may include a first signal section and a second signal section subsequent to the first signal section, and the second signal section may be shorter than the first signal section.

The first signal section may include input key data indicating the input key, and the second signal section may include a preset waveform indicating the input key without including the input key data.

The second signal section of the first wireless signal may be identified as noise by the external apparatus.

The first wireless signal may include a first signal section, a second signal section and a third signal section, and the third signal section may be shorter than the first and second signal sections.

Each of the first signal section and the second signal section may include input key data indicating the input key, and the third signal section may include a preset waveform indicating the input key without including the input key data.

The third signal section may be identified as noise by the external apparatus.

The second wireless signal may include a first signal section and a second signal section that is shorter than the first signal section.

The first signal section of the second wireless signal may include input key data indicating the input key, and the second signal section of the second wireless signal may not include the input key data, and the second signal section of the second wireless signal may be configured to control the external apparatus in a manner corresponding to the first signal section of the second wireless signal.

The processor may be further configured to operate based on the input key indicated by the first wireless signal while operating in a first mode, and output the second wireless signal based on the first wireless signal while operating in a second mode.

The processor may be further configured to control the second wireless signal, which has a longer period than the first wireless signal, to be output based on the first wireless signal while operating in the second mode.

The first wireless signal may include a first signal section, a second signal section and a third signal section, the second signal section and the third signal section may be shorter than the first signal section, and wherein the processor may be further configured to control the second wireless signal to be output during the third signal section.

The first wireless signal may include first to nth signal sections, and the second wireless signal may include a blank section subsequent to the first signal section.

The first wireless signal may include signal sections which are different in length and alternately provided.

The processor may be further configured to control the second wireless signal to be output during a short signal section of the first wireless signal.

One of the signal sections may include input key data indicating the input key, and the short signal section may not include the input key data.

The processor may be further configured to control the signal transmitter to output the second wireless signal only during the idle section of the first wireless signal.

According to embodiments of the disclosure, there is provided a method of controlling an electronic apparatus, the method including: receiving a first wireless signal that indicates an input key; identifying an external apparatus based on the input key; identifying a second wireless signal based on the input key and the external apparatus; and repeatedly outputting the while the first wireless signal is repeatedly received. Each of the first wireless signal and the second wireless signal alternately includes a signal section corresponding to the input key and an idle section, and the second wireless signal may be output during the idle section of the first wireless signal.

According to embodiments of the disclosure, there is provided a display apparatus including: a display panel configured to display an image; a signal receiver configured to receive a first wireless signal; a signal transmitter configured to output a second wireless signal; and a processor configured to: identify an external apparatus based on an input key indicated by the first wireless signal as the first wireless signal is repeatedly received through the signal receiver; identify the second wireless signal based on the input key and the external apparatus; and control the signal transmitter to repeatedly output the second wireless signal while the first wireless signal is repeatedly received. Each of the first wireless signal and the second wireless signal alternately includes a signal section corresponding to the input key and an idle section, and the processor is further configured to control the signal transmitter to output the second wireless signal during the idle section of the first wireless signal.

According to embodiments of the disclosure, there is provided a remote controller for controlling an electronic apparatus, the remote controller including: an input interface; a signal transmitter; and a processor configured to control the signal transmitter to output a first wireless signal including input key data indicating a first input based on the first input being received via the input interface and control the signal transmitter to output a second wireless signal wireless signal that does not include the input key data based the first input being successively received.

The first wireless signal may include a custom code indicating a target apparatus and the input key data.

The processor may be further configured to identify whether the first input has been successively received based on the first input being consecutively received within a threshold time period.

The processor may be further configured to, based on the first input being consecutively received and separated by a time period greater than the threshold time period, control the signal transmitter to output the first wireless signal.

According to embodiments of the disclosure, there is provided a method performed by a remote controller, the method including: receiving a first input via an interface of the remote controller; outputting, via a signal transmitter of the remote controller, a first wireless signal including input key data based on the first input being received via the interface; and outputting, via the signal transmitter, a second wireless signal wireless signal that does not include the input key data based the first input being successively received.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 1 is a schematic view of a universal remote controller, an electronic apparatus, and an external apparatus according to an embodiment;

DETAILED DESCRIPTION

Figure 2:
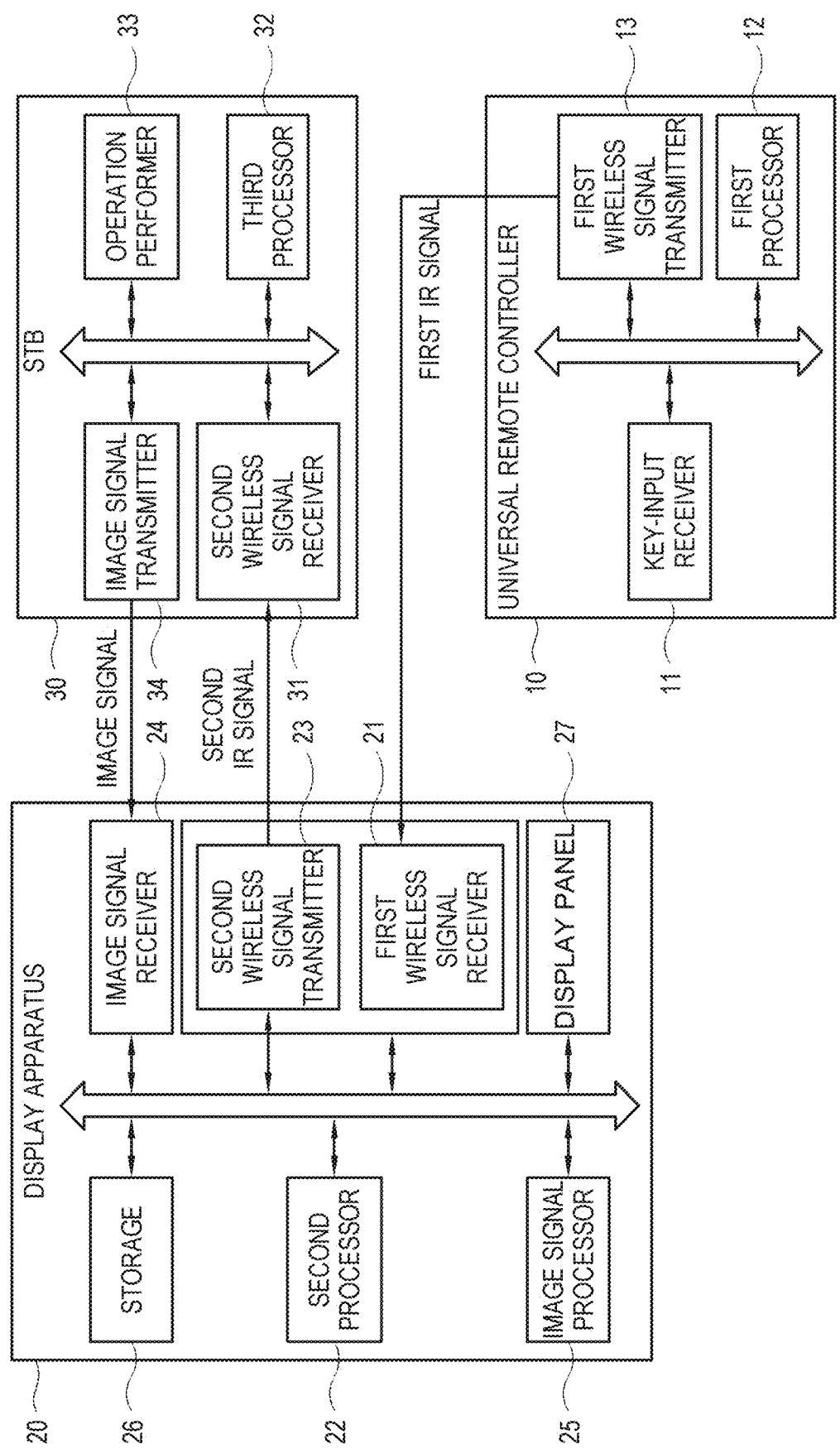
FIG. 2 is a block diagram of a universal remote controller, a display apparatus, and a set-top box according to an embodiment.

Below, embodiments will be described in detail with reference to accompanying drawings. In the drawings, like numerals or symbols refer to like elements having substantially the same function. However, the illustrated configurations and functions are not to be construed as limiting. In the following descriptions, details about publicly known functions or features may be omitted for conciseness.

As used herein, the terms "1st" or "first" and "2nd" or "second" may use corresponding components regardless of importance or order and are used to distinguish a component from another without limiting the components. Also, it will be understood that terms "comprise", "include", "have", etc., do not preclude the presence or addition of one or more other features, numbers, steps, operations, elements, components or combination thereof. In addition, a "module" or a "portion" may perform at least one function or operation, be achieved by hardware, software or combination of hardware and software, and be integrated into at least one module. Further, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

FIG. 1 is a schematic view of a universal remote controller 10, an electronic apparatus 2, and an external apparatus 3 according to a first embodiment;

The universal remote controller 10 functions to control both the electronic apparatus 2 and the external apparatus 3. The electronic apparatus 2 may be a display apparatus 20, a personal computer, a server, a notebook computer, etc. The electronic apparatus 2 and the external apparatus 3 are connected by connector 4, which may include a wired or wireless interface, and exchange data, for example, image-signal data with each other.

The electronic apparatus 2 and the external apparatus 3 are connected/have access to each other through the connector 4. For example, the connector 4 may include a high definition multimedia interface (HDMI) interface. The electronic apparatus 2 receives an audio/video (AV) signal and a control signal from the external apparatus 3 through the connector 4.

The connector 4 for connecting the external apparatus 3 and the electronic apparatus 2 is not limited to the HDMI interface, but may employ other wired or wireless interfaces of various standards.

For example, the wired interface may be a cable of predetermined standards. The wireless interface may include at least one of Wi-Fi, Wi-Fi Direct or Bluetooth.

In the electronic apparatus 2 according to an embodiment, the external apparatus 3 may be a set-top box (STB) that outputs a signal to be displayed by the electronic apparatus 2 as an image of various pieces of content. In the electronic apparatus 2 according to an embodiment, the external apparatus 3 may be a one connect (CC) box connected to the electronic apparatus 2 by a single cable.

The external apparatus 3 receives content from a plurality of image sources, i.e., signal sources.

In the disclosure, the external apparatus 3 is not limited to the STB, but may for example include an OC box, a media box, an over-the-top (OTT) box, a Blu-ray, digital versatile disc (DVD) or other optical disc player, a desktop, laptop or other personal computer (PC), a mobile device such as a smart phone, tablet or other smart pad, etc. Further, the external apparatus 3 may receive content provided in the form of a real-time streaming file through a wired or wireless network.

FIG. 2 is a block diagram of the universal remote controller 10, the display apparatus 20, and the STB 30 according to an embodiment.

As shown in FIG. 2, the universal remote controller transmits a wireless signal, e.g., a first infrared (IR) signal to the electronic apparatus 20 in order to control the display apparatus 20 and the STB 30. The universal remote controller 10 includes a key-input receiver 11, a first processor 12 and a first wireless-signal transmitter 13.

The key-input receiver 11 may include a TV button 102 for controlling the display apparatus 20, and an STB button 104 for controlling the STB 30. The TV button 102 may for example include a power button, a volume button, etc., of the display apparatus 20. The STB button 104 may include a power button, a channel button, etc., of the STB. When a user presses the TV button 102 or the STB button 104, a corresponding key input is received.

The first processor 12 controls a first wireless-signal transmitter 13 to output input-key data, i.e., a first IR signal having control-target apparatus information and key information in response to a key input received from the key-input receiver 11.

The first processor 12 performs control to operate general elements of the universal remote controller 10. The first processor 12 executes a control program (or an instruction) to perform such control operation. The first processor 12 includes at least one universal processor that loads at least a part of the control program from a nonvolatile memory, in which the control program is installed, to a volatile memory and executes the loaded control program, and may for example be actualized by a central processing unit (CPU), an application processor (AP), or a microprocessor.

In the disclosure, the first processor 12 may be actualized as included in a main system-on-chip (SoC) mounted to a built-in printed circuit board (PCB) of the universal remote controller 10.

The first wireless-signal transmitter 13 transmits the first IR signal of a predetermined frequency band to the display apparatus 20.

The first wireless-signal transmitter 13 may be actualized as a communication circuitry including at least one electronic device for outputting infrared light. According to an embodiment, the first wireless-signal transmitter 13 includes one or more IR light emitting diodes (hereinafter, referred to as IR LED or IRED).

According to an embodiment, the first wireless-signal transmitter 13 may include a signal generator to generate the first IR signal. The signal generator may generate an IR signal modulated by a predetermined frequency band e.g., carrier frequencies of 38 kHz, 40 kHz, 56 kHz, etc.

The display apparatus 20 may receive and process broadcast content based on at least one of a broadcast signal, broadcast information, or broadcast data received from the transmitter of the broadcasting station. The display apparatus 20 may wirelessly receive a radio frequency (RF) signal, i.e., a broadcast signal from the broadcasting station. The display apparatus 20 may include an antenna to receive the broadcast signal, and a tuner to be tuned to a channel for the broadcast signal.

The broadcast signal may be received through a terrestrial wave, a cable, a satellite, etc., and the signal source is not limited to the broadcasting station. In other words, any apparatus or station capable of transceiving data may be included in the image source according to the disclosure.

The display apparatus 20 may serve as a smart TV or an Internet protocol (IP) TV. The smart TV refers to a TV that can receive and display a broadcast signal in real time, support a web-browsing function for searching and consuming various pieces of content through Internet while displaying the broadcast signal in real time, and, provide convenient user environments. Further, the smart TV includes an open-source software platform and thus provides an interactive service to a user. Accordingly, the smart TV may provide a user with various pieces of content, for example, an application for providing a predetermined service through the open-source software platform. Such an application refers to an application program for providing various kinds of service, and may for example include applications for providing services such as social network service, finance, news, weather, a map, music, a movie, a game, an electronic book, etc.

The standards for the signal received in the display apparatus 20 may be configured by various methods corresponding to the types of the apparatus. For example, image content may be received by cables based on a HDMI, composite video, component video, super video, syndicat des constructeurs d'appareils radiorécepteurs et téléviseurs (SCART), a universal serial bus (USB), or other standards.

The display apparatus 20 may receive image content from various external apparatuses, such as the STB 30, through the wired or wireless network communication, and there are no limits to the kind of communication.

Specifically, the display apparatus 20 may perform at least one of the wireless communication using an access point (AP) or the wireless communication for direct connection with other devices without the AP. For example, the display apparatus 20 may receive content from an image source through the wireless network communication such as Wi-Fi, Wi-Fi Direct, or the Bluetooth. Further, the display apparatus 20 may receive content through the wired network communication such as Ethernet, etc.

The display apparatus 20 according to an embodiment performs the wireless communication with peripheral devices such as the universal remote controller 10. The wireless communication may include IR communication using a predetermined frequency band.

Referring back to FIG. 2, the display apparatus 20 includes a first wireless signal receiver 21, a second processor 22, a second wireless signal transmitter 23, an image signal receiver 24, an image signal processor 25, a storage 26, and a display 27.

Figure 4:
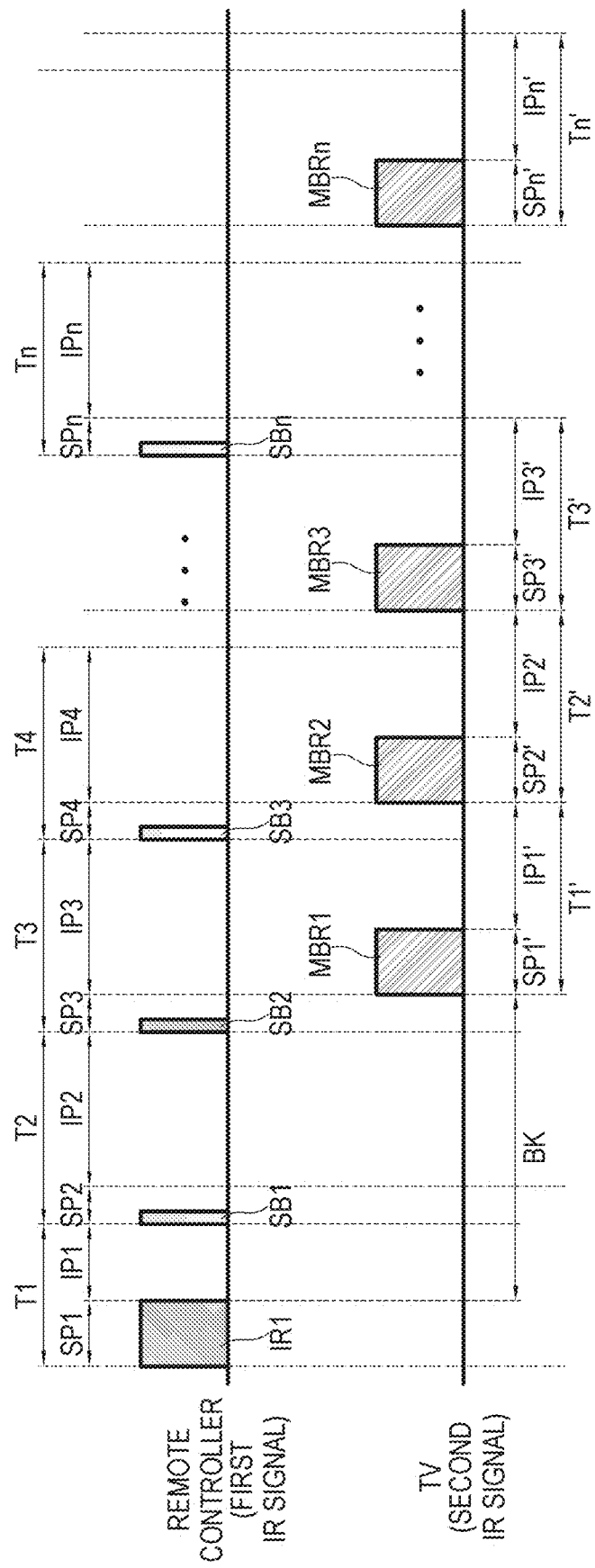
FIG. 4 shows waveforms of a first infrared signal output from the universal remote controller and a second infrared signal output from the display apparatus according to an embodiment.

The first wireless signal receiver 21 receives the first IR signal shown in FIG. 4. The first wireless signal receiver 21 may be actualized by a communication circuitry including at least one electronic device that detects IR light of a predetermined wavelength and generates an electric signal. According to an embodiment, the first wireless signal receiver 21 includes an IR photodiode.

According to an embodiment, the first wireless signal receiver 21 may for example be installed in a certain area (e.g., a lower portion) of a front edge (i.e., a bezel) of the display apparatus 20. In this case, the first wireless signal receiver 21 may be installed to be adjacent to the second wireless signal transmitter 23.

According to an embodiment, the first wireless signal receiver 21 is provided in the display apparatus 20. According to an alternative embodiment, when the first wireless signal receiver 21 is provided in the STB 30, the electronic apparatus 2 is actualized as the STB 30 and the external apparatus 3 is actualized as the display apparatus 20.

The second processor 22 performs control to operate general elements of the display apparatus 20. The second processor 22 executes a control program (or an instruction) to perform such control. The second processor 22 includes at least one universal processor that loads at least a part of a control program from a nonvolatile memory, in which the control program is installed, to a volatile memory, and executes the loaded control program, and may for example be actualized by a CPU, an application processor (AP), or a microprocessor.

The second processor 22 may include a single core, a dual core, a triple core, a quad core, and other multiple cores. The second processor 22 may include a plurality of processors, for example, a main processor and a sub processor that operates in a sleep mode (during which only standby power is supplied without operation of the display apparatus). Further, the processor, the ROM, and the RAM are connected to one another through an internal bus, and the ROM and the RAM are included in the storage 26.

The second processor 22 may be actualized as included in the main SoC mounted to the PCB internally provided in the display apparatus 20. Alternatively, the main SoC may further include the image processor.

The control program may include a program achieved by at least one of a basic input/output system (BIOS), a device driver, an OS, a firmware, a platform, or an application. According to an embodiment, the application may be previously installed or stored in the display apparatus 20 when the display apparatus 20 is manufactured, or may be installed in the display apparatus 20 on the basis of application data received from the outside when it is required in the future. The application data may for example be downloaded from an external server, such as an application market, to the display apparatus 20. Such an external server is merely an example of the computer program product according to the disclosure and embodiments are not limited thereto.

According to an embodiment, the operation of the second processor 22 may be actualized by a computer program stored in the computer program product provided separately from the display apparatus 20. In this case, the computer program product includes a memory in which an instruction corresponding to a computer program is stored, and a processor. When the instruction is executed by the second processor 22, a tertiary to nth-order first IR signals SB2, SB3, . . . , SBn given in the form of a short burst signal of the first IR signal of the universal remote controller 10, may be received in the first wireless signal receiver 21 as shown in FIG. 4. The first IR signals may be preceded by the primary first IR signal IR1 having the input key data. Based on the tertiary to nth-order first IR signals SB2, SB3, . . . , SBn, the second wireless signal transmitter 23 may be controlled to output the second wireless signal, for example, the second IR signal. In this case, the second processor 22 controls the second wireless signal transmitter to output the second IR signal in an idle section of the first IR signal. Below, control operation of the second processor 22 will be described in detail with the operation of the display apparatus 20 to be described later.

To control the STB 30, the second wireless signal transmitter 23 outputs the second IR signal under control of the second processor 22. The second wireless signal transmitter 23 may be actualized as a communication circuitry that includes at least one electronic device capable of outputting infrared light. According to an embodiment, the second wireless signal transmitter 23 includes one or more IR light emitting diodes (hereinafter, also referred to as IR LED or IRED).

According to an embodiment, the second wireless signal transmitter 23 may include a signal generator to generate the second IR signal. The signal generator may generate an IR signal modulated by a predetermined frequency band e.g., carrier frequencies of 38 kHz, 40 kHz, 56 kHz, etc.

The image signal receiver 24 receives content from the image source. The image signal receiver 24 includes the tuner to be tuned to a channel for a broadcast signal.

The image signal receiver 24 includes the connector 4, for example, the HDMI interface through which the display apparatus 20 connects with the external image source by a wire. The display apparatus 20 may receive content from the image source such as the STB 30 through the wire-connected connector.

The connector 4 may be actualized by a communication circuitry that includes a data input/output interface where ports, communication modules (e.g., S/W modules, chips, etc.), and the like corresponding to various kinds of communication protocols are combined.

The connector 4 receives a signal from the image source, but may be configured to interactively transmit and receive a signal.

According to an embodiment, the connector 4 is connected to the image source through an HDMI cable, but the connection method is not limited to the HDMI method. Further, the display apparatus 20 and the image source may be wirelessly connected by the communicator including the wireless communication module such as Wi-Fi.

According to an embodiment, the apparatus connected to the display apparatus 20 by a cable through the connector 4 includes the STB 30, the optical disc player, the PC, and the like image source, but the disclosure is not limited thereto. For example, according to an alternative embodiment, the display apparatus 20 may connect with a mobile apparatus by a cable through the connector 4.

The image signal processor 25 performs various audio/video processes previously set with regard to an image signal of content. The image signal processor 25 outputs the image signal generated or combined by performing such an image processing process to the display 27, thereby displaying an image based on the image signal. The image signal processed by the image signal processor 25 may be based on data stored in the nonvolatile storage 26 such as a flash memory, a hard disk drive (HDD), etc.

The image signal processor 25 includes a decoder for decoding the image signal to correspond to an image format of the display apparatus 20, and a scaler for adjusting the image signal to correspond to the output resolution of the display panel. According to an embodiment, the decoder may for example be actualized by a moving picture experts group (MPEG) decoder. However, there are no limits to the kind of content to be processed by the image signal processor 25. For example, the content to be processed by the image signal processor 25 may include a moving image such as a video clip, but also a still image such as a JPEG file, a picture, a wallpaper, etc.

There are no limits to the kind of image processing processes performed by the image signal processor 25. For example, the image signal processor 25 may further perform at least one of various processes such as de-interlacing for converting an interlaced-type broadcast signal into a progressive-type broadcast signal, detail enhancement, frame refresh rate conversion, and line scanning.

The image signal processor 25 may be actualized by a group of individual elements for independently performing such processes, or may be included in a main system-on-chip (SoC) where many functions are integrated. The main SoC may further include at least one micro-processor or central processing unit (CPU) as an example of the second processor 22 (to be described later).

According to an embodiment, the image signal processor 25 may be actualized by a video board where various chipsets, a memory, electronic parts, wiring lines, and other circuit components for performing such processes are mounted on to a PCB. In this case, the image signal processor 25 and the second processor 22 of the display apparatus 20 may be provided in a single video board. Of course, this is merely an example, and alternatively the image signal processor 25 and the second processor 22 may be arranged in a plurality of printed circuit boards connectable with each other.

The storage 26 may be configured to store various pieces of data of the display apparatus 20. The storage 26 may be actualized by a nonvolatile memory (or a writable ROM) which can mirror changes and retain data even though the display apparatus 20 is powered off. That is, the storage 26 may be provided as one among a flash memory, an HDD, an electrically programmable ROM (EPROM) or an electrically erasable and programmable ROM (EEPROM). The storage 26 may further include a dynamic RAM (DRAM), a static RAM (SRAM) or other volatile memory, of which reading or writing speed is faster than that of the nonvolatile memory.

Data stored in the storage 26 may for example include not only an operating system (OS) for driving the display apparatus 20 but also various pieces of software, programs, applications, image data, appended data, etc., executable on the OS.

The storage 26 may be configured to store graphic data as the appended data. The graphic data is output to the display 27 as an image signal processed by the image signal processor 25, and may be displayed as graphics such as on-screen display (OSD), a graphic user interface (GUI, hereinafter also referred to as "user interface (UI)"), etc., in a certain area on the screen forming the display panel 27.

According to an embodiment, the storage 26 is configured to store the input key data of the first IR signal received from a first wireless signal receiver 21, for example, control target apparatus information, key information, etc., of the external apparatus 3.

According to an embodiment, the storage 26 is configured to store information about the second IR signal (i.e., a reference signal) output from the second wireless signal transmitter 23. This second IR signal has a preset length and waveform corresponding to the received first IR signal.

The display 27 displays an image based on the image signal processed by the image signal processor 25.

The display 27 includes a display panel with a screen to display an image. The display panel may for example be variously actualized by liquid crystal, plasma, a light emitting diode, an organic light emitting diode, a surface-conduction electron-emitter, a carbon nano-tube, nano-crystal, or other display type without limitations.

The display 27 may further include an additional element (for example, the driver) according to its types, in addition to the display panel for displaying an image. The driver may be actualized by one or more driver integrated circuits (IC), and output an electric signal for driving the light source, the electronic element forming the screen or other display surface so that the display panel can display an image based on the image signal received from the image signal processor 25.

Referring back to FIG. 2, the STB 30 includes a second wireless signal receiver 31, a third processor 32, the operation performer 33, and an image signal transmitter 34.

The second wireless signal receiver 31 receives the second IR signal shown in FIG. 4 from the second wireless signal transmitter 23 of the display apparatus 20. The second IR signal includes button information, for example, a channel number of the universal remote controller 10 pressed by a user. The second wireless signal receiver 31 may be actualized by a communication circuitry including at least one electronic element that generates an electric signal by detecting IR light having a predetermined wavelength. According to an embodiment, the second wireless signal receiver 31 includes an IR photodiode.

The third processor 32 performs control to operate general elements of the STB 30. The third processor 32 executes a control program (or an instruction) to perform such a control operation. The third processor 32 analyzes the second IR signal received from the second wireless signal receiver 31 and performs control corresponding to the input data. The third processor 32 processes the short burst signals transmitted from the first wireless-signal transmitter 13 of the universal remote controller 10, i.e., the secondary to nth-order first IR signal SB1~SBn as noise signals. In result, the secondary to nth-order first IR signal SB1~SBn of the universal remote controller 10 and the primary to nth-order second IR signals MBR1, MBR2, . . . , MBRn of the display apparatus 20 are processed in the STB 30 without interference.

The third processor 32 includes at least one universal processor that loads at least a part of the control program from the nonvolatile memory, in which the control program is installed, to the volatile memory and executes the loaded control program, and may for example be achieved by a central processing unit (CPU), an application processor (AP), or a microprocessor.

The operation performer 33 performs various functions under control of the third processor 32. The operation performer 33 may for example include a broadcast receiving and signal processor that receives an image signal from the broadcasting station and processes the signal. The broadcast receiving and signal processor makes change to a channel for the second IR signal under control of the third processor 32. Further, the broadcast receiving and signal processor processes a broadcast signal received from the changed channel into video, audio and other data and then outputs them to the image signal transmitter 34.

The image signal transmitter 34 outputs the image data processed by the operation performer 33, for example, the broadcast receiving and signal processor to the display apparatus 20 under control of the third processor 32.

Below, operation of the universal remote controller 10 to output the first IR signal will be described in detail with reference to FIGS. 3 and 4.

Figure 3:
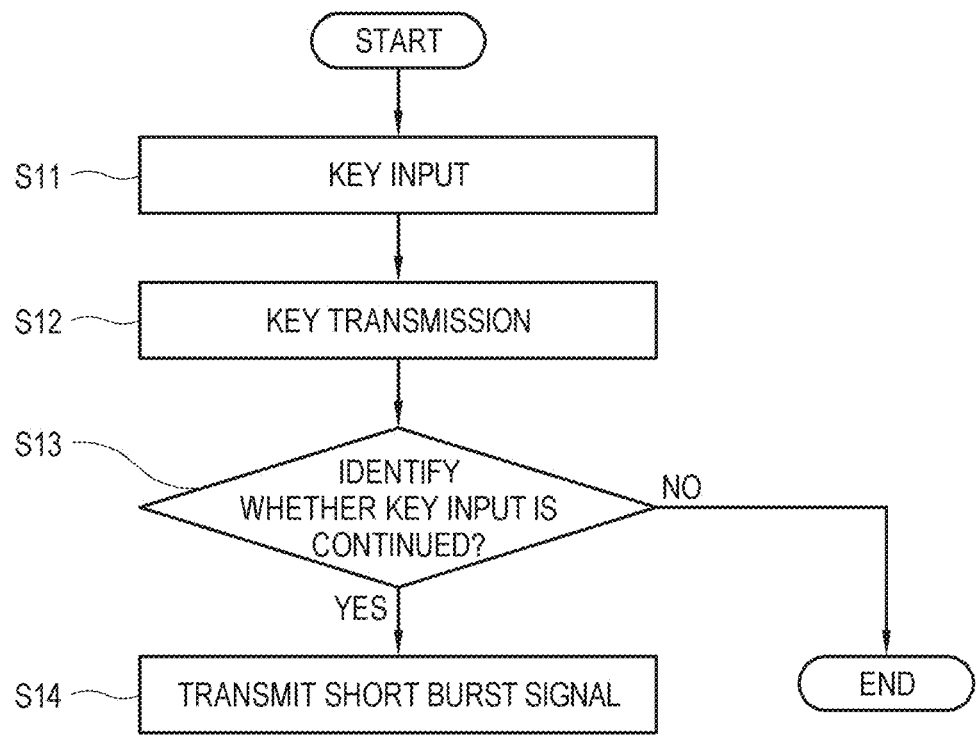
FIG. 3 is a flowchart of outputting a first infrared signal in a universal remote controller according to an embodiment.
Figure 5:
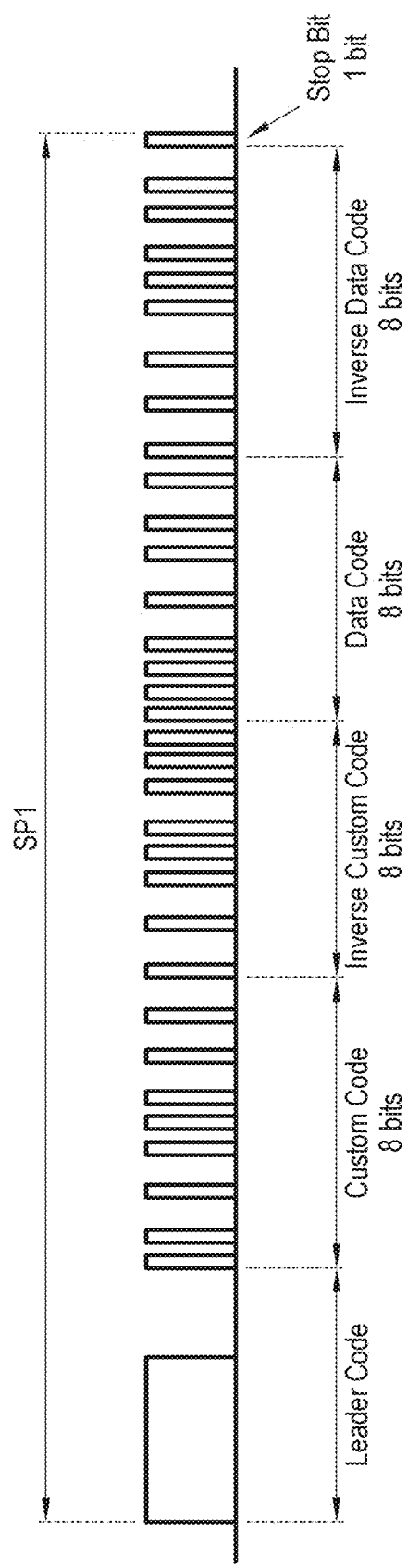
FIG. 5 shows a waveform of the first infrared signal of FIG. 4 in a first signal section according to an embodiment.

FIG. 3 is a flowchart of outputting a first IR signal in a universal remote controller, FIG. 4 shows waveforms of a first IR signal output from the universal remote controller and a second IR signal output from the display apparatus according to the first embodiment, and FIG. 5 shows a waveform of the first IR signal of FIG. 4 in a first signal section.

Referring to FIG. 3, at operation S11, a key input is received from the key-input receiver 11. The key input includes the input key data, i.e., information about a control target apparatus to be controlled by a user who presses the button 102 or 104. For example, the control target apparatus information includes key information about functions of the control target apparatus such as the display apparatus 20 or the STB 30.

At operation S12, the key input is transmitted to the first processor 12. The first processor 12 controls the first wireless-signal transmitter 13 to output the first IR signal having the input key data corresponding to the received key input.

As an unrestricted example, the first IR signal has a period of about 108 milliseconds (ms). However, it may be difficult for a user to precisely touch and press the button in sync with about 108 ms, and therefore the user presses the button for a time much longer than about 108 ms.

At operation S13, the first processor 12 identifies whether a user continuously presses the button 102 or 104, i.e., whether the key input is continuously received. For example, the first processor 12 may determine whether the same key input is received within a threshold time period. The first processor 12 stops outputting the first IR signal when the key input is not continuously received. On the other hand, when the key input is continuously received, the first processor 12 performs operation S14.

At operation S14, the first processor 12 controls the first wireless-signal transmitter 13 to output for example a short burst signal when the key input is continuously received.

Referring to FIG. 4, the first IR signal includes primary to nth-order first IR signals IR1, SB1, SB2, . . . , SBn. The primary to nth-order first IR signals IR1, SB1, SB2, . . . , SBn have first to nth periods T1, T2, T3, . . . , Tn, respectively. The first to nth periods T1, T2, T3, . . . , Tn have first to nth signal sections SP1, SP2, SP3, . . . , SPn and first to nth idle sections IP1, IP2, IP3, . . . , IPn. The first period T1 has the first signal section SP1 of for example about 60 ms and the idle section IP1 of for example of 70 ms. The second to nth periods T2, T3, . . . , Tn may for example have a time length of 180 ms.

The second IR signal, as shown in FIG. 4, includes the primary to nth-order second IR signals MBR1, MBR2, . . . , MBRn corresponding to the third to nth first IR signals SB2, . . . , SBn of the first IR signal. The second IR signal has a blank section BK in which the second IR signal is not generated corresponding to the primary and secondary first IR signals IR1 and SB1 of the first IR signal. The primary to nth-order second IR signals MBR1, MBR2, . . . , MBRn have first to nth periods T1', T2', . . . , Tn', respectively. The first to nth periods T1', T2', . . . , Tn' have first to nth signal sections SP1', SP2', . . . , SPn' and first to nth idle sections IP1', IP2', . . . , IPn'. The first to nth periods T1', T2', . . . , Tn' may for example have a time length of 180 ms.

FIG. 5 shows a waveform of the first signal section SP1 by way of example. As shown therein, the first signal section SP1 includes a leader code, a custom code, a custom inverse code, a data code and a data inverse code as a national electrical code. The custom code refers to a code for identifying the control target apparatus, for example the display apparatus 20 or the STB 30, and the custom inverse code refers to a custom code for an error check. The data code refers to a code concerned with key information about the functions, for example, a channel, a volume, etc., of the display apparatus 20 or the STB 30, and the data inverse code refer to a data code for an error check.

The first idle section IP1 is a section where the signal is not transmitted.

The second to nth signal sections SP2, SP3, . . . , SPn include the short burst signal narrower than the first signal section SP1. The short burst signal does not include the input key data, for example, at least one of the custom code, the custom inverse code, the data code and the data inverse code. The short burst signal is thus regarded as noise by the external apparatus 3, for example, the STB 30. On the other hand, the electronic apparatus 2, for example, the display apparatus 20 is previously set to identify that the short burst signal is equivalent to the signal of the first signal section SP1 when the short burst signal is received.

Below, operation of the display apparatus 20 that receives and processes the first IR signal of the universal remote controller 10 will be described in detail.

Figure 6:
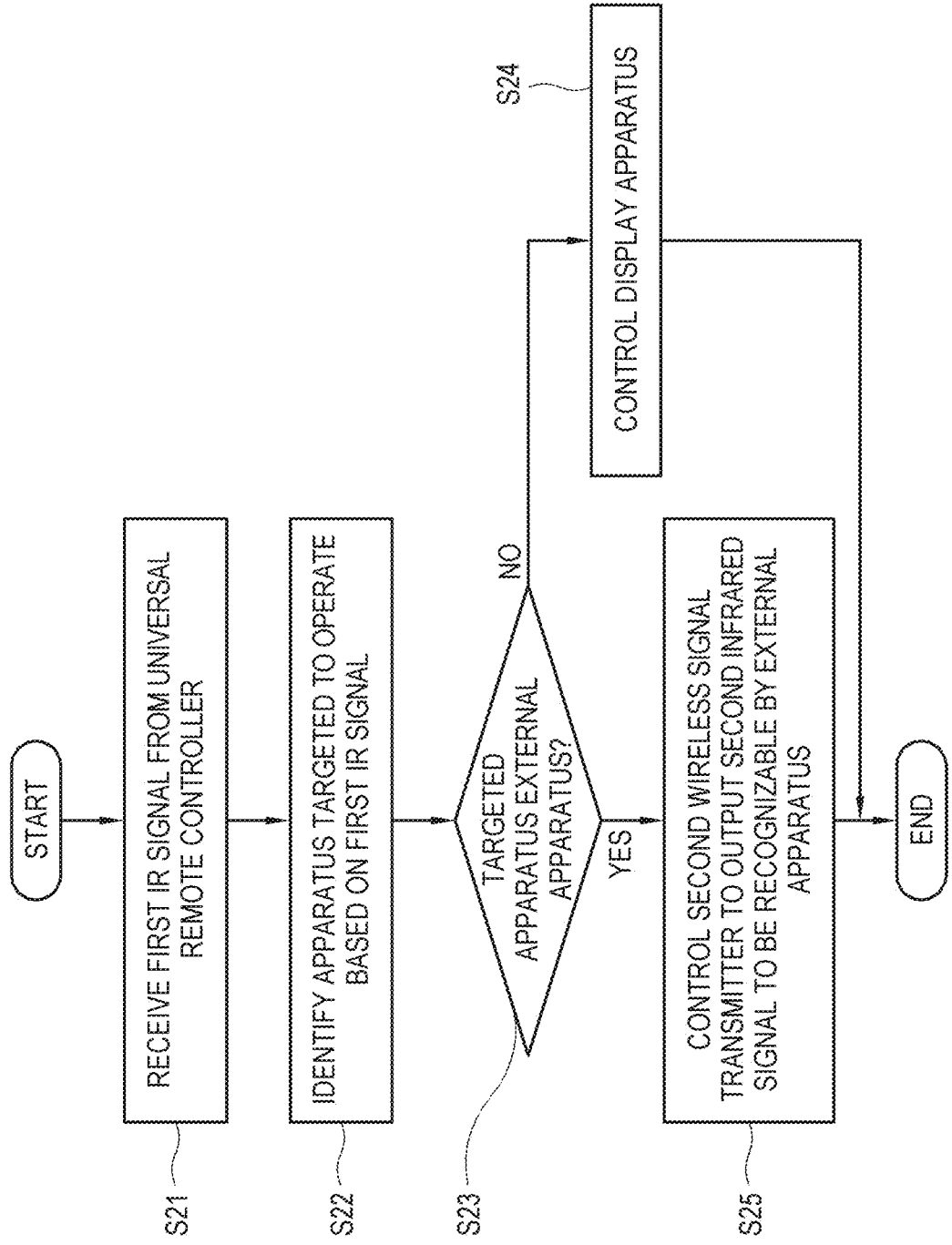
FIG. 6 is a flowchart of operating the display apparatus according to an embodiment.

FIG. 6 is a flowchart showing the operation of the display apparatus according to an embodiment.

At operation S21, the first wireless signal receiver receives the first IR signal from the universal remote controller 10.

At operation S22, the second processor 22 analyzes the input key data by analyzing the received first IR signal. In this case, the input key data may be used to identify information about the control target apparatus to be controlled and information about the key indicating the function to be controlled.

At operation S23, the second processor 22 identifies whether the control target apparatus is the external apparatus based on the analyzed input key data. When the control target apparatus is not the external apparatus but itself, i.e., the electronic apparatus, e.g., the display apparatus 20, operation S24 of a first mode is performed. When the control target apparatus is the external apparatus, e.g., the STB 30, operation S25 of a second mode is performed.

At operation S24, the second processor 22 controls the function, e.g., the volume or power of the display apparatus 20 based on the input key data from the first IR signal.

At operation S25, the second processor 22 controls the second wireless signal transmitter 23 to iteratively output the second IR signal, which allows the identified external apparatus to recognize the input key, in response to the reception of the first IR signal. In this case, each of the first IR signal and the second IR signal alternates between the signal section and the idle section based on a given period. The second processor 22 controls the second IR signal to be within the idle section of the first IR signal so that the first IR signal and the second IR signal do not interfere with each other.

According to the first embodiment, an iterative first IR signal showing the same input key as an initial IR signal is replaced by the short burst signal, thereby securing a relatively sufficient idle section. Such a short burst signal not only secure a sufficient idle section but also makes the external apparatus identify the short burst signal as noise, thereby shortening time taken in iteratively processing the first IR signal. In result, there is no interference even though the second IR signal is output immediately when the short burst signal is received.

Below, the first embodiment will be described in detail with reference to FIG. 4.

The first IR signal includes primary to nth-order first IR signals IR1, SB1, SB2, . . . , SBn. The primary to nth-order first IR signals IR1, SB1, SB2, . . . , SBn have first to nth periods T1, T2, T3, . . . , Tn, respectively. The first to nth periods T1, T2, T3, Tn have the first to nth signal sections SP1, SP2, SP3, . . . , SPn and the first to nth idle sections IP1, IP2, IP3, . . . , IPn. The first period T1 has the first signal section SP1 of for example about 60 ms and the idle section IP1 of for example 70 ms, and the second to nth periods T2, T3, . . . , Tn have the second to nth signal sections SP2, SP3, . . . , SPn of 30 ms, and the second to nth idle sections IP2, IP3, . . . , IPn of 150 ms.

The primary first IR signal IR1 is a signal having normal input key data, and the secondary to nth-order first IR signals SB1, . . . , SBn are short burst signals having no input key data.

The second IR signal includes primary to nth-order second IR signals MBR1, MBR2, . . . , MBRn corresponding to the tertiary to nth-order first IR signals SB2, . . . , SBn of the first IR signal. The primary to nth-order second IR signals MBR1, MBR2, . . . , MBRn have first to nth periods T1', T2', . . . , Tn', respectively. The first to nth periods T1', T2', . . . , Tn' have first to nth signal sections SP1', SP2', . . . , SPn' and first to nth idle sections IP1', IP2', . . . , IPn'. The first to nth periods T1', T2', . . . , Tn' have a time length of for example 180 ms.

The second processor 22 identifies that the tertiary to nth-order first IR signals SB2, . . . , SBn are equivalent to the primary first IR signal IR1 having the input key data even though the tertiary to nth-order first IR signals SB2, . . . , SBn, i.e., the short burst signals having no input key data are received, and outputs the primary to nth-order second IR signals MBR1, MBR2, . . . , MBRn for controlling the STB 30. In other words, the primary to nth-order second IR signals MBR1, MBR2, . . . , MBRn are output within the third to nth idle sections IP3, . . . , IPn of the first IR signal and thus do not interfere with the third to nth signal sections SP3, . . . , SPn.

The second IR signal has a blank section BK in which the second IR signal is not generated corresponding to the primary and secondary first IR signals IR1 and SB1 of the first IR signal. The first IR signal transmitted from the first wireless-signal transmitter 13 of the universal remote controller 10 may be received in not only the display apparatus 20 but also the STB 30. The blank section BK refers to a section of considering time taken by the external apparatus, i.e., the STB 30 in receiving and processing the primary first IR signal IR1 from the universal remote controller 10. In other words, a predetermined period of time, for example, 280 ms, is taken by the STB 30 in processing the primary first IR signal IR1 when the primary first IR signal IR1 is undesirably received.

The STB 30 receives and processes the short burst signal, i.e., the tertiary to nth-order first IR signals SB2, SB3, . . . , SBn as noise, and the display apparatus 20 does not need the blank section to pass before outputting the secondary to nth-order second IR signals MBR2, . . . , MBRn. In result, the secondary to nth-order second IR signals MBR2, . . . , MBRn do not interfere with the tertiary to nth-order first IR signal SB2, SB3, . . . , SBn even when the periods of the secondary to nth-order second IR signals MBR2, . . . , MBRn are short, thereby more quickly giving a response to a user.

Figure 7:
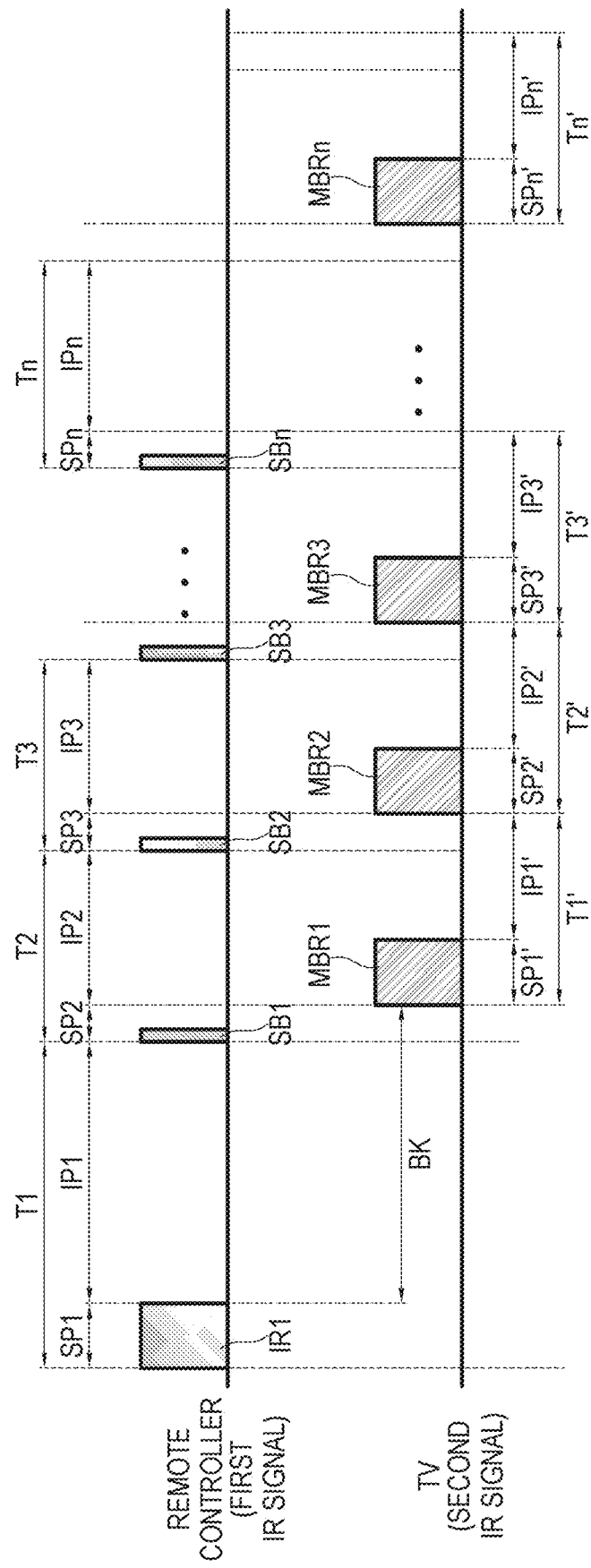
FIGS. 7 to 11 show waveforms of a first infrared signal output from a universal remote controller and a second infrared signal output from a display apparatus according to an embodiment.

FIG. 7 shows waveforms of a first IR signal output from a universal remote controller and a second IR signal output from a display apparatus according to a second embodiment. In contrast to the first embodiment discussed above with reference to FIG. 4, FIG. 7 shows the first IR signal which is output by delaying the secondary first IR signal SB1 of the short burst signal subsequent to the primary first IR signal IR1 as much as 180 ms.

The first IR signal includes primary to nth-order first IR signal IR1, SB1, SB2, . . . , SBn as shown in FIG. 7. The primary to nth-order first IR signals IR1, SB1, SB2, . . . , SBn have the first to nth periods T1, T2, T3, . . . , Tn. The first to nth periods T1, T2, T3, . . . , Tn have the first to nth signal sections SP1, SP2, SP3, . . . , SPn and the first to nth idle section IP1, IP2, IP3, . . . , IPn. The first period T1 may have the first signal section SP1 of for example about 60 ms and the idle section IP1 of for example 250 ms, and the second to nth periods T2, T3, . . . , Tn have the second to nth signal section SP2~SPn of for example about 30 ms and the second to nth idle sections IP2~IPn of for example 150 ms.

The primary first IR signal IR1 is a signal having normal input key data, and the secondary to nth-order first IR signals SB1, . . . , SBn are short burst signals having no input key data. Here, the primary first IR signal IR1 secures a long first idle section IP1 of about 250 ms, and delays the output of the second IR signal, thereby avoiding interference between the primary first IR signal IR1 and the second IR signal.

The second IR signal, as shown in FIG. 7, includes the primary to nth-order second IR signals MBR1, MBR2, . . . , MBRn corresponding to the secondary to nth-order first IR signals SB1, SB2, . . . , SBn of the first IR signal. The second IR signal has a blank section BK in which the second IR signal is not generated corresponding to the primary first IR signal IR1 of the first IR signal. The blank section BK refers to a section for avoiding interference between the primary first IR signal IR1 and the primary second IR signal MBR1 in the STB 30.

As described above, the second embodiment dispenses with the process of ignoring the secondary first IR signal SB1 to secure the blank section BK in the first embodiment of FIG. 4, and immediately outputs the primary second IR signal MBR1 when the second first IR signal of the short burst signal is received from the universal remote controller 10.

Figure 8:
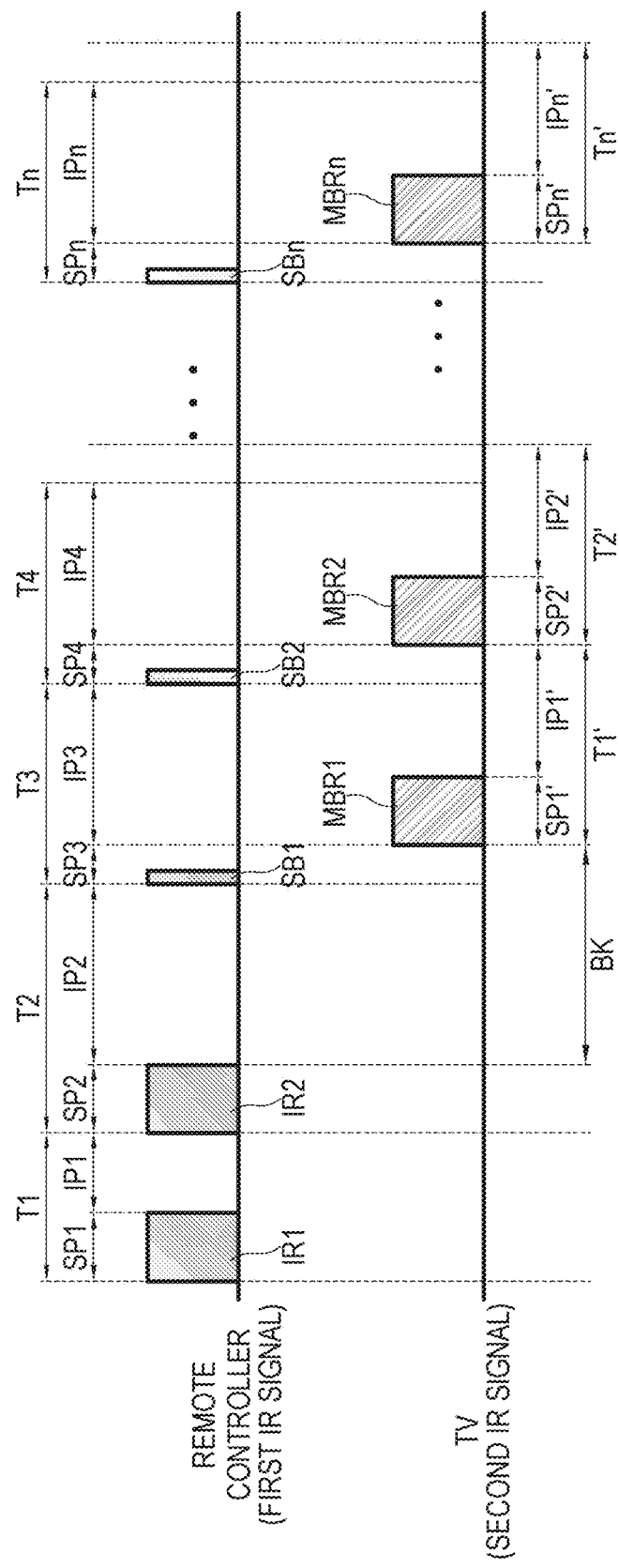

FIG. 8 shows waveforms of a first IR signal output from a universal remote controller and a second IR signal output from a display apparatus according to a third embodiment. In contrast to the embodiments discussed above with reference to FIGS. 4 and 7, in which only the primary first IR signal IR1 is the signal having the input key data and the other secondary to nth-order first IR signals SB1~SBn are the short burst signals having no input key data, the third embodiment shown in FIG. 8 shows that the primary and secondary first IR signals IR1 and IR2 are successively output as signals having the input key data.

The first IR signal, as shown in FIG. 8, includes primary to nth-order first IR signals IR1, IR2, SB1, SB2, . . . , SBn. The primary to nth-order first IR signals IR1, IR2, SB1, SB2, . . . , SBn have the first to nth periods T1, T2, T3, T4, . . . , Tn, respectively. The first to nth periods T1, T2, T3, T4, . . . , Tn have the first to nth signal sections SP1, SP2, SP3, SP4, . . . , SPn and the first to nth idle sections IP1, IP2, IP3, IP4, . . . , IPn. The first period T1 has the first signal section SP1 of for example about 60 ms and the idle section IP1 of for example 48 ms, the second period T2 has the first signal section SP2 of for example about 60 ms and the idle section IP2 of for example 250 ms, and the third to nth periods T3, . . . , Tn have third to nth signal sections SP3~SPn of for example about 30 ms and third to nth idle sections IP3~IPn of for example 150 ms.

The primary and secondary first IR signals IR1 and IR2 are signals having normal input key data, and the tertiary to nth-order first IR signals SB1, . . . , SBn are short burst signals having no input key data. Here, the secondary first IR signal IR2 secures a long first idle section IP2 of about 250 ms, thereby delaying the output of the second IR signal.

The second IR signal, as shown in FIG. 8, includes the primary to nth-order second IR signals MBR1, MBR2, . . . , MBRn corresponding to tertiary to nth-order first IR signals SB1, SB2, . . . , SBn of the first IR signal. The second IR signal has the blank section BK in which the second IR signal is not generated corresponding to the secondary first IR signal IR2 of the first IR signal. The blank section BK refers to a section for avoiding interference between the secondary first IR signal IR2 and the primary second IR signal MBR1 in the STB 30.

As described above, the display apparatus according to the third embodiment stably outputs the second IR signal MBR1~MBRn corresponding to the tertiary to nth-order first IR signal SB1, . . . , SBn with reference to the secondary first IR signal IR2 even when the primary first IR signal IR1 is not normally transmitted according to ambient environments, thereby improving reliability.

Figure 9:
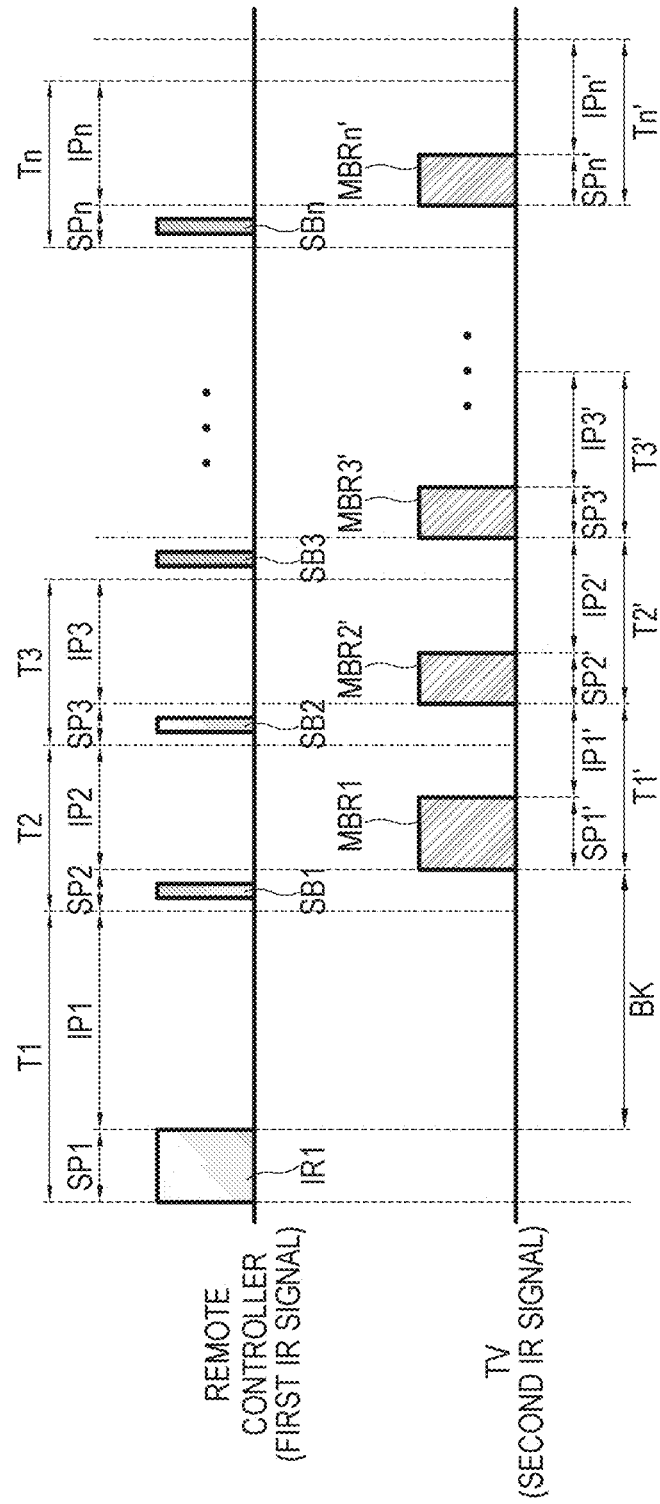

FIG. 9 shows waveforms of a first IR signal output from a universal remote controller and a second IR signal output from a display apparatus according to a fourth embodiment. In the fourth embodiment, the primary second IR signal MBR1 and the secondary to nth-order second IR signals MBR2'~MBRn' are set differently from those of the first to third embodiments. In this case, the secondary to nth-order second IR signal MBR2'~MBRn' do not have the input key data but are identified as equivalent to the primary second IR signal MBR1 in the STB 30.

The first IR signal, as shown in FIG. 9, includes primary to nth-order first IR signals IR1, SB1, SB2, SB3, . . . , SBn. The primary to nth-order first IR signals IR1, SB1, SB2, SB3, . . . , SBn have first to nth periods T1, T2, T3, T4, . . . , Tn, respectively. The first to nth periods T1, T2, T3, T4, . . . , Tn have first to nth signal sections SP1, SP2, SP3, SP4, . . . , SPn and first to nth idle sections IP1, IP2, IP3, IP4, . . . , IPn. The first period T1 has the first signal section SP1 of for example about 60 ms and the idle section IP1 of for example 250 ms, the second period T2 has the first signal section SP2 of for example about 30 ms and the idle section IP2 of for example 150 ms, and the third to nth-order periods T3, . . . , Tn have the third to nth signal sections SP3—SPn of for example about 30 ms and the third to nth idle sections IP3~IPn of for example 135 ms.

The primary first IR signal IR1 is a signal having normal input key data, and the secondary to nth-order first IR signals SB1~SBn are the short burst signals having no input key data. Here, the primary first IR signal IR1 secures a long first idle section IP1 of about 250 ms to delay the output of the second IR signal, thereby avoiding interference.

The second IR signal, as shown in FIG. 9, includes the primary to nth-order second IR signals MBR1, MBR2', MBR3', . . . , MBRn' corresponding to the secondary to nth-order first IR signals SB1~SBn of the first IR signal. The primary to nth-order second IR signals MBR1, MBR2', MBR3', . . . , MBRn' have first to nth periods T1', T2', 3', . . . , Tn', respectively. The first to nth periods T1', T2', T3', . . . , Tn' have first to nth signal sections SP1', SP2', SP3', . . . , SPn' and the first to nth idle sections IP1', IP2', IP3', . . . , IPn'. The first period T1' has the first signal section SP1' of for example about 60 ms and the idle section IP1' of for example 120 ms, and the second to nth-order periods T2', . . . , Tn' have the second to nth signal sections SP2'~SPn' of for example about 45 ms and the second to nth idle sections IP2'~IPn' of for example 120 ms.

The primary first IR signal IR1 is a signal having normal input key data, and the secondary to nth-order first IR signals SB1~SBn are the short burst signals having no input key data. The STB 30 identifies the secondary to nth-order first IR signals SB1~SBn as noise.

The primary second IR signal MBR1 is a signal having normal input key data, and the secondary to nth-order second IR signals MBR2'~MBRn' are the short burst signals having no input key data. The STB 30 may be previously set to identify that the secondary to nth-order second IR signals MBR2'~MBRn' are equivalent to the primary second IR signal MBR1 when the secondary to nth-order second IR signals MBR2'~MBRn' are received. Further, the second IR signal has a blank section BK in which the second IR signal is not generated corresponding to the primary first IR signal IR1 of the first IR signal. The blank section BK is a section for avoiding interference between the primary first IR signal IR1 and the primary second IR signal MBR1.

As described above, according to the fourth embodiment, the secondary to nth-order second IR signals MBR2'~MBRn' have shorter periods than the primary second IR signal MBR1, thereby more quickly giving a control response to a user without interference.

Figure 10:
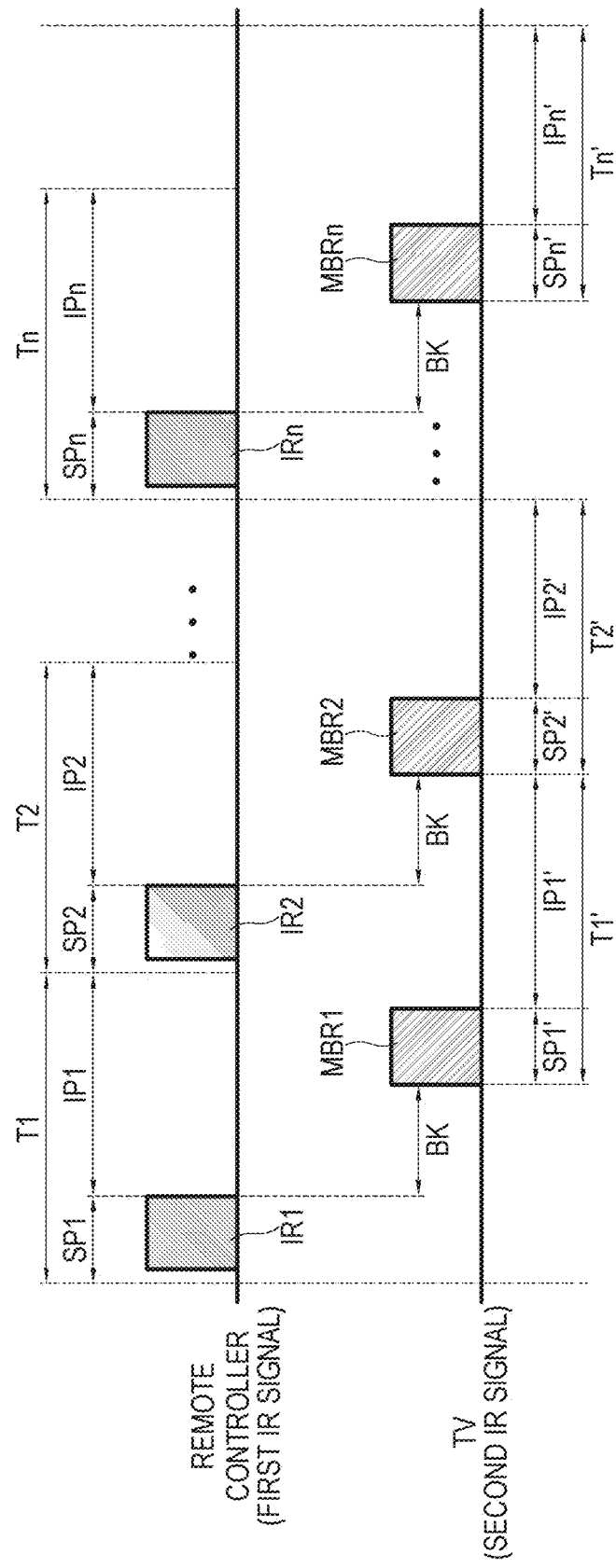

FIG. 10 shows waveforms of a first IR signal output from a universal remote controller and a second IR signal output from a display apparatus according to a fifth embodiment. In contrast to the embodiments discussed above, the fifth embodiment shows that both the first and second IR signals include signals having input key data. In this case, the first and second IR signals were adjusted in period to thereby avoid interference therebetween.

The first IR signal, as shown in FIG. 10, includes primary to nth-order first IR signals IR1, IR2, IR3, . . . , IRn. The primary to nth-order first IR signals IR1, IR2, IR3, . . . , IRn have first to nth periods T1, T2, T3, . . . , Tn, respectively. The first to nth periods T1, T2, T3, . . . , Tn have first to nth signal sections SP1, SP2, SP3, . . . , SPn and first to nth idle sections IP1, IP2, IP3, . . . , IPn. The first to nth periods T1, . . . , Tn have the first to nth signal sections SP1~SPn of for example about 60 ms and the first to nth idle sections IP1~IPn of for example 340 ms.

The primary to nth-order first IR signals IR1, IR2, IR3, . . . , IRn are signals having normal input key data. Here, each of the primary to nth-order first IR signals IR1, IR2, IR3, . . . , IRn secure long first idle sections IP1~IPn of about 340 ms to delay the output of the second IR signal, thereby avoiding the interference.

The second IR signal, as shown in FIG. 10, includes primary to nth-order second IR signals MBR1, MBR2, MBR3, . . . , MBRn corresponding to primary to nth-order first IR signals IR1, IR2, IR3, . . . , IRn. The primary to nth-order second IR signals MBR1, MBR2, MBR3, . . . , MBRn have first to nth periods T1', T2', T3', . . . , Tn', respectively. The first to nth periods T1', T2', T3', . . . , Tn' have first to nth signal sections SP1', SP2', SP3', . . . , SPn' and first to nth idle sections IP1', IP2', IP3', . . . , IPn'. The first to nth periods T1', . . . , Tn' have first to nth signal section SP1'~SPn' of for example about 60 ms and first to nth idle sections IP1'~IPn' of for example 340 ms.

The primary to nth-order second IR signals MBR1, MBR2, MBR3, . . . , MBRn respectively include first to nth idle sections IP1'~IPn' of 340 ms and thus secure the blank sections of for example 280 ms. The blank section refers to a section for avoiding interference between primary to nth-order first IR signals IR1, IR2, IR3, . . . , IRn and primary to nth-order second IR signals MBR1, MBR2, MBR3, . . . , MBRn by securing time taken by the STB 30 in receiving and processing the primary to nth-order first IR signals IR1, IR2, IR3, . . . , IRn.

As described above, the fifth embodiment prevents interference between the first IR signal and the second IR signal by prolonging the periods of both the first IR signal and the second IR signal.

Figure 11:
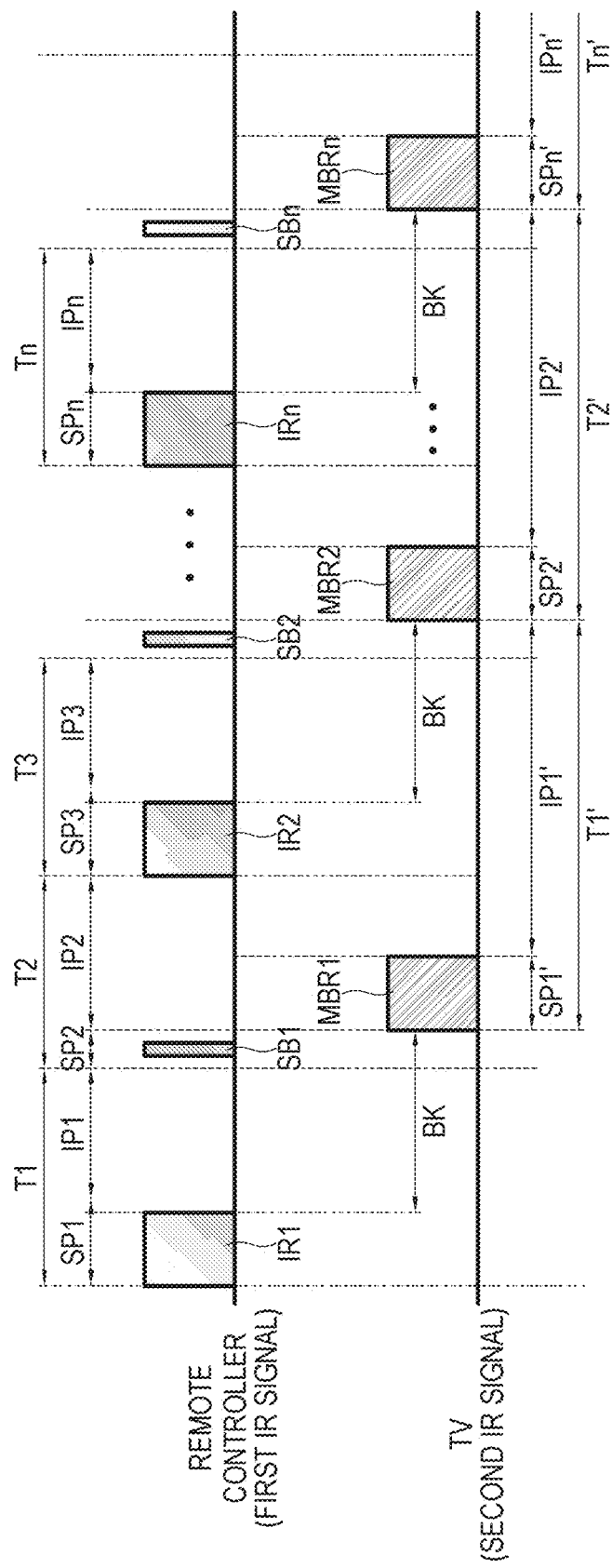

FIG. 11 shows waveforms of a first IR signal output from a universal remote controller and a second IR signal output from a display apparatus according to a sixth embodiment. According to the sixth embodiment, odd-numbered order first IR signals IR1, IR2, . . . IRn having the input key data and even-numbered order first IR signals SB1, SB2, . . . , SBn having no input key data as the short burst signals are alternately output, and the second IR signal is output corresponding to the even-numbered order first IR signals SB1, SB2, . . . SBn.

The first IR signal, as shown in FIG. 11, includes primary to nth-order first IR signals IR1, SB1, IR2, SB2, IR3 . . . , SBn. The primary to nth-order first IR signals IR1, SB1, IR2, SB2, IR3 . . . , SBn have first to nth periods T1, T2, T3, T4, T5, . . . , Tn, respectively. The first to nth periods T1~Tn have first to nth signal sections SP1~SPn and first to nth idle sections IP1~IPn. The first, third and fifth periods T1, T3 and T5 have first, third and fifth signal sections SP1, SP3 and SP5 of for example about 60 ms and first, third and fifth idle sections IP1, IP3 and IP5 of for example 250 ms, respectively. The second and fourth periods T2 and T4 have second and fourth signal sections SP2 and SP4 of for example about 30 ms and second and fourth idle sections IP2 and IP4 of for example 150 ms, respectively.

As described above, the odd-numbered order first IR signals IR1, IR3, IR5, . . . are signals having normal input key data. The even-numbered order first IR signals IR2, IR4, . . . are short burst signals having no input key data. Here, each of the odd-numbered order first IR signals IR1, IR3, IR5, . . . secure long idle sections IP1, IP3, IP5, . . . of about 240 ms to delay the output of the second IR signal, thereby avoiding the interference.

The second IR signal, as shown in FIG. 11, includes primary to nth-order second IR signals MBR1, MBR2, . . . , MBRn corresponding to the odd-numbered first IR signals IR1, IR3, IR5, . . . . The primary to nth-order second IR signals MBR1, MBR2, . . . , MBRn includes first to nth idle sections IP1'~IPn' long enough to secure the blank section of for example 280 ms. The blank section refers to a section for avoiding interference between the odd-numbered order first IR signals IR1, IR3, IR5 . . . and the primary to nth-order second IR signals MBR1, MBR2, . . . , MBRn by securing time taken by the STB 30 in receiving and processing the odd-numbered first IR signals IR1, IR3, IR5 . . . .

As described above, according to the sixth embodiment, the odd-numbered order first IR signals IR1, IR2, . . . having the input key data are alternately given, so that the second IR signals MBR1~MBRn can be stably output with reference to other first IR signals even when some first IR signals having the input key data are not normally transmitted according to ambient environments, thereby improving reliability.

According to the disclosure, the first IR signal transmitted from the universal remote controller to the electronic apparatus in order to control the external apparatus and the second IR signal transmitted from the electronic apparatus that receives the first IR signal in order to control the external apparatus are controlled not to interfere with each other, thereby having an effect on preventing abnormal operation.

Although a few embodiments have been shown and described, it will be appreciated by those skilled in the art that changes may be made in these embodiments without departing from the principles and spirit of the disclosure, the scope of which is defined in the appended claims and their equivalents.

What is claimed is:
1. An electronic apparatus comprising:
a signal receiver configured to receive a first wireless signal, the first wireless signal comprising a first signal section and a plurality of second signal sections that are repetitively received after the first signal section, each of the plurality of second signal sections being shorter than the first signal section;
a signal transmitter configured to output a second wireless signal; and
a processor configured to, based on the first signal section of the first wireless signal received through the signal receiver corresponding to an input key, identify an external apparatus to operate according to the input key; and based on the plurality of second signal sections of the first wireless signal being repetitively received through the signal receiver, control the signal transmitter to repetitively output the second wireless signal, so that the identified external apparatus receives the second wireless signal and operates according to the input key,
wherein the first wireless signal comprises the plurality of second signal sections and a plurality of idle sections which alternate with each other based on a given period,
wherein the processor controls the signal transmitter to output a third signal section of the second wireless signal in an idle section of the first wireless signal,
wherein the first signal section comprises input key data indicating the input key, and
wherein the plurality of second signal sections do not comprise the input key data.
2. The electronic apparatus according to claim 1, wherein each of the plurality of second signal sections of the first wireless signal is identified as noise by the external apparatus.
3. The electronic apparatus according to claim 1, wherein the first wireless signal further comprises a fourth signal section, and
wherein each of the plurality of second signal sections is shorter than the first and fourth signal sections.
4. The electronic apparatus according to claim 3, wherein the first and fourth signal sections comprise the input key data, and
wherein each of the plurality of second signal sections does not comprise the input key data.

5. The electronic apparatus according to claim 4, wherein each of the plurality of second signal sections is identified as noise by the external apparatus.

6. The electronic apparatus according to claim 1, wherein the second wireless signal comprises a fifth signal section shorter than the third signal section.

7. The electronic apparatus according to claim 6, wherein the third signal section of the second wireless signal comprises the input key data identifying the input key, and
wherein the fifth signal section of the second wireless signal comprises no input key data and is identified by the external apparatus as equivalent to the third signal section of the second wireless signal.

8. The electronic apparatus according to claim 1, wherein the processor is further configured to operate based on the input key indicated by the first wireless signal in a first mode, and control the second wireless signal, which is targeted to be recognized by the external apparatus, to be output based on the first wireless signal in a second mode.

9. The electronic apparatus according to claim 8, wherein the processor is further configured to control the second wireless signal, which has a longer period than the first wireless signal, to be output based on the first wireless signal in the second mode.

10. The electronic apparatus according to claim 1, wherein the first wireless signal further comprises a sixth signal section,
wherein the sixth signal section of the first wireless signal is shorter than the first signal section, and
wherein the processor is further configured to control the second wireless signal to be output based on the sixth signal section.

11. The electronic apparatus according to claim 1, wherein the first wireless signal comprises first to nth signal sections, and
wherein the second wireless signal comprises a blank section subsequent to the first signal section.

12. The electronic apparatus according to claim 1, wherein the first wireless signal comprises signal sections which are different in length and alternately provided.

13. The electronic apparatus according to claim 12, wherein the processor is further configured to control the second wireless signal to be output based on a short signal section of the first wireless signal.

14. The electronic apparatus according to claim 13, wherein the short signal section comprises no input key data.

15. A method of controlling an electronic apparatus, comprising:
receiving a first signal section and a plurality of second signal sections of a first wireless signal, the plurality of second signal sections being repetitively received after the first signal selection, and each of the plurality of second signal sections being shorter than the first signal section;
based on the first signal section corresponding to an input key, identifying an external apparatus to operate according to the input key; and
based on the plurality of second signal sections of the first wireless signal being repetitively received, repetitively outputting a second wireless signal, so that the identified external apparatus receives the second wireless signal and operates according to the input key,
wherein the first wireless signal comprises the plurality of second signal sections and a plurality of idle sections which alternate with each other based on a given period,
wherein a third signal section of the second wireless signal is output in an idle section of the first wireless signal,
wherein the first signal section comprises input key data indicating the input key, and
wherein the plurality of second signal sections do not comprise the input key data.

16. A display apparatus comprising:
a display configured to display an image;
a signal receiver configured to receive a first wireless signal, the first wireless signal comprising a first signal section and a plurality of second signal sections that are repetitively received after the first signal section, each of the plurality of second signal sections being shorter than the first signal section;
a signal transmitter configured to output a second wireless signal; and
a processor configured to: based on the first signal section of the first wireless signal received through the signal receiver corresponding to an input key, identify an external apparatus to operate according to the input key; and based on the plurality of second signal sections of the first wireless signal being repetitively received through the signal receiver, control the signal transmitter to repetitively output the second wireless signal, so that the identified external apparatus receives the second wireless signal and operates according to the input key,
wherein the first wireless signal comprises the plurality of second signal sections and a plurality of idle sections which alternate with each other based on a given period,
wherein the processor controls the signal transmitter to output a third signal section of the second wireless signal in an idle section of the first wireless signal,
wherein the first signal section comprises input key data indicating the input key, and
wherein the plurality of second signal sections do not comprise the input key data.

* * * * *